US008650365B2

(12) United States Patent
Bernbo et al.

(10) Patent No.: US 8,650,365 B2
(45) Date of Patent: Feb. 11, 2014

(54) METHOD AND DEVICE FOR MAINTAINING DATA IN A DATA STORAGE SYSTEM COMPRISING A PLURALITY OF DATA STORAGE NODES

(75) Inventors: Stefan Bernbo, Karlskrona (SE); Christian Melander, Rodeby (SE); Roger Persson, Karlskrona (SE); Gustav Petersson, Sturko (SE)

(73) Assignee: Compuverde AB (SE)

( * ) Notice: Subject to any disclaimer, the term of this patent is extended or adjusted under 35 U.S.C. 154(b) by 42 days.

(21) Appl. No.: 13/224,393

(22) Filed: Sep. 2, 2011

(65) Prior Publication Data

US 2013/0061232 A1    Mar. 7, 2013

(51) Int. Cl.
*G06F 12/00*    (2006.01)

(52) U.S. Cl.
USPC .......................................................... 711/151

(58) Field of Classification Search
USPC .......................................................... 711/151
See application file for complete search history.

(56) References Cited

U.S. PATENT DOCUMENTS

| | | | |
|---|---|---|---|
| 3,707,707 A * | 12/1972 | Spencer et al. ................. | 360/53 |
| 6,003,065 A | 12/1999 | Yan et al. | |
| 6,055,543 A | 4/2000 | Christensen et al. | |
| 6,389,432 B1 | 5/2002 | Pothapragada et al. | |
| 6,470,420 B1 | 10/2002 | Hospodor | |
| 6,782,389 B1 | 8/2004 | Chrin et al. | |
| 6,925,737 B2 | 8/2005 | Bolduan et al. | |
| 6,985,956 B2 | 1/2006 | Luke et al. | |
| 7,200,664 B2 | 4/2007 | Hayden | |
| 7,206,836 B2 | 4/2007 | Dinker et al. | |
| 7,266,556 B1 | 9/2007 | Coates | |
| 7,320,088 B1 | 1/2008 | Gawali | |
| 7,340,510 B1 | 3/2008 | Liskov et al. | |
| 7,352,765 B2 | 4/2008 | Dai et al. | |
| 7,406,484 B1 | 7/2008 | Srinivasan et al. | |
| 7,487,305 B2 * | 2/2009 | Hill et al. ..................... | 711/158 |

(Continued)

FOREIGN PATENT DOCUMENTS

| | | |
|---|---|---|
| CN | 1726454(A) | 1/2006 |
| EP | 774723(A3) | 7/1998 |

(Continued)

OTHER PUBLICATIONS

Nancy P. Kronenberg et al., "VAXclusters: A Closely-Coupled Distributed System, ACM Transactions on Computer Systems", vol. 4, No. 2, May 1986, pp. 130-146.

(Continued)

*Primary Examiner* — Mardochee Chery
(74) *Attorney, Agent, or Firm* — Condo Roccia LLP

(57) ABSTRACT

A method and device for maintaining data in a data storage system, comprising a plurality of data storage nodes, the method being employed in a storage node in the data storage system and comprising: monitoring and detecting, conditions in the data storage system that imply the need for replication of data between the nodes in the data storage system; initiating replication processes in case such a condition is detected, wherein the replication processes include sending multicast and unicast requests to other storage nodes, said requests including priority flags, receiving multicast and unicast requests from other storage nodes, wherein the received requests include priority flags, ordering the received requests in different queues depending on their priority flags, and dealing with requests in higher priority queues with higher frequency than requests in lower priority queues.

16 Claims, 8 Drawing Sheets

(56) References Cited

U.S. PATENT DOCUMENTS

| | | | |
|---|---|---|---|
| 7,503,052 B2 | 3/2009 | Castro et al. | |
| 7,546,486 B2 | 6/2009 | Slik et al. | |
| 7,568,069 B2 | 7/2009 | Jantz et al. | |
| 7,590,672 B2 | 9/2009 | Slik et al. | |
| 7,593,966 B2 | 9/2009 | Therrien et al. | |
| 7,624,155 B1 | 11/2009 | Nordin et al. | |
| 7,624,158 B2 | 11/2009 | Slik et al. | |
| 7,631,045 B2 | 12/2009 | Boerries et al. | |
| 7,631,313 B2 | 12/2009 | Mayhew et al. | |
| 7,634,453 B1 | 12/2009 | Bakke et al. | |
| 7,647,329 B1 | 1/2010 | Fischman et al. | |
| 7,769,711 B2 | 8/2010 | Srinivasan et al. | |
| 7,778,972 B1 | 8/2010 | Cormie et al. | |
| 7,822,766 B2 | 10/2010 | Arndt et al. | |
| 7,840,992 B1 | 11/2010 | Dufrene et al. | |
| 7,885,982 B2 | 2/2011 | Wight et al. | |
| 8,073,881 B1 | 12/2011 | Georgiev | |
| 8,190,561 B1 | 5/2012 | Poole et al. | |
| 8,255,430 B2 | 8/2012 | Dutton et al. | |
| 8,296,398 B2 | 10/2012 | Lacapra et al. | |
| 8,417,828 B2 | 4/2013 | Ma et al. | |
| 2001/0034812 A1 | 10/2001 | Ignatius et al. | |
| 2001/0047400 A1 | 11/2001 | Coates et al. | |
| 2002/0042693 A1 | 4/2002 | Kampe et al. | |
| 2002/0103888 A1 | 8/2002 | Janz et al. | |
| 2002/0145786 A1 | 10/2002 | Chang et al. | |
| 2003/0026254 A1 | 2/2003 | Sim | |
| 2003/0154238 A1 | 8/2003 | Murphy et al. | |
| 2003/0172089 A1 | 9/2003 | Douceur et al. | |
| 2003/0177261 A1 | 9/2003 | Sekiguchi et al. | |
| 2004/0059805 A1 | 3/2004 | Dinker et al. | |
| 2004/0064729 A1 | 4/2004 | Yellepeddy | |
| 2004/0078466 A1 | 4/2004 | Coates et al. | |
| 2004/0088297 A1 | 5/2004 | Coates et al. | |
| 2004/0111730 A1 | 6/2004 | Apte | |
| 2005/0010618 A1 | 1/2005 | Hayden | |
| 2005/0015431 A1 | 1/2005 | Cherkasova | |
| 2005/0015461 A1 | 1/2005 | Richard et al. | |
| 2005/0038990 A1 | 2/2005 | Sasakura et al. | |
| 2005/0177550 A1 | 8/2005 | Jacobs et al. | |
| 2005/0193245 A1 | 9/2005 | Hayden et al. | |
| 2005/0246393 A1 | 11/2005 | Coates et al. | |
| 2005/0256894 A1 | 11/2005 | Talanis et al. | |
| 2005/0278552 A1 | 12/2005 | Delisle et al. | |
| 2005/0283649 A1 | 12/2005 | Turner et al. | |
| 2006/0031439 A1* | 2/2006 | Saffre | 709/223 |
| 2006/0080574 A1 | 4/2006 | Saito et al. | |
| 2006/0090045 A1 | 4/2006 | Bartlett et al. | |
| 2006/0090095 A1 | 4/2006 | Massa et al. | |
| 2007/0022087 A1 | 1/2007 | Bahar et al. | |
| 2007/0022121 A1 | 1/2007 | Bahar et al. | |
| 2007/0022122 A1 | 1/2007 | Bahar et al. | |
| 2007/0022129 A1 | 1/2007 | Bahar et al. | |
| 2007/0055703 A1 | 3/2007 | Zimran et al. | |
| 2007/0088703 A1 | 4/2007 | Kasiolas et al. | |
| 2007/0094269 A1 | 4/2007 | Mikesell et al. | |
| 2007/0094354 A1 | 4/2007 | Soltis | |
| 2007/0198467 A1 | 8/2007 | Wiser et al. | |
| 2007/0276838 A1 | 11/2007 | Abushanab et al. | |
| 2007/0288494 A1 | 12/2007 | Chrin et al. | |
| 2007/0288638 A1 | 12/2007 | Vuong et al. | |
| 2008/0043634 A1 | 2/2008 | Wang et al. | |
| 2008/0077635 A1 | 3/2008 | Sporny et al. | |
| 2008/0104218 A1 | 5/2008 | Liang et al. | |
| 2008/0109830 A1 | 5/2008 | Giotzbach et al. | |
| 2008/0168157 A1 | 7/2008 | Marchand | |
| 2008/0172478 A1 | 7/2008 | Kiyohara et al. | |
| 2008/0198752 A1 | 8/2008 | Fan et al. | |
| 2008/0270822 A1 | 10/2008 | Fan et al. | |
| 2009/0043922 A1 | 2/2009 | Crowther | |
| 2009/0132543 A1 | 5/2009 | Chatley et al. | |
| 2009/0172211 A1 | 7/2009 | Perry et al. | |
| 2009/0172307 A1 | 7/2009 | Perry et al. | |
| 2009/0271412 A1 | 10/2009 | Lacapra et al. | |
| 2009/0287842 A1 | 11/2009 | Plamondon | |
| 2010/0115078 A1 | 5/2010 | Ishikawa et al. | |
| 2010/0169391 A1 | 7/2010 | Baptist et al. | |
| 2010/0169415 A1 | 7/2010 | Leggette et al. | |
| 2010/0185693 A1 | 7/2010 | Murty et al. | |
| 2010/0198888 A1 | 8/2010 | Blomstedt et al. | |
| 2010/0198889 A1 | 8/2010 | Byers et al. | |
| 2011/0055353 A1 | 3/2011 | Tucker et al. | |
| 2011/0072206 A1 | 3/2011 | Ross et al. | |
| 2011/0252204 A1* | 10/2011 | Coon et al. | 711/150 |
| 2012/0331021 A1 | 12/2012 | Lord | |
| 2013/0103851 A1 | 4/2013 | Umeki et al. | |

FOREIGN PATENT DOCUMENTS

| | | |
|---|---|---|
| EP | 934568(B1) | 6/2003 |
| EP | 1521189(A2) | 4/2005 |
| EP | 1578805(A2) | 9/2005 |
| EP | 1669850(A1) | 6/2006 |
| EP | 1798934 A1 | 6/2007 |
| EP | 2031513 A2 | 3/2009 |
| EP | 2031513 A3 | 3/2009 |
| JP | 06-348527 A | 12/1994 |
| JP | 11-249874 A | 9/1999 |
| JP | 2003-030012 A | 1/2003 |
| JP | 2003-223286 A | 8/2003 |
| JP | 2003-248607 A | 9/2003 |
| JP | 2003-271316 A | 9/2003 |
| JP | 2007-058275 A | 3/2007 |
| JP | 2008-250767 A | 10/2008 |
| WO | WO 99/38093 A1 | 7/1999 |
| WO | WO-0118633(A1) | 3/2001 |
| WO | WO-0235359(A2) | 5/2002 |
| WO | WO 02/44835 A2 | 6/2002 |
| WO | WO-2004053677(A2) | 6/2004 |
| WO | WO 2006/124911 A2 | 11/2006 |
| WO | WO 2007/014296 A2 | 2/2007 |
| WO | WO 2007/115317 A2 | 10/2007 |
| WO | WO-2007134918(A1) | 11/2007 |
| WO | WO-2008069811(A1) | 6/2008 |
| WO | WO-2008/102195 | 8/2008 |
| WO | WO 2009/048726 A1 | 4/2009 |
| WO | WO 2010/046393 A2 | 4/2010 |
| WO | WO 2010/080533 A2 | 7/2010 |
| WO | WO 2011/131717 A1 | 10/2011 |

OTHER PUBLICATIONS

HP Volume Shadowing for OpenVMS, "Introduction to Volume Shadowing for OpenVMS", OpenVMS Alpha 7.3-2, Sep. 2003.
Keith Parris, "Using OpenVMS Clusters for Diaster Tolerance", HP Services—Systems Engineering.
Wataru Katsurashima et al., "NAS Switch: A novel CIFS server virtualization", IEEE, 2003.
U.S. Appl. No. 13/224,404, filed Sep. 2, 2011, Bernbo et al.
U.S. Appl. No. 13/224,415, filed Sep. 2, 2011, Bernbo et al.
U.S. Appl. No. 13/224,424, filed Sep. 2, 2011, Bernbo et al.
U.S. Appl. No. 13/224,433, filed Sep. 2, 2011, Bernbo et al.
U.S. Appl. No. 13/224,446, filed Sep. 2, 2011, Bernbo et al.
U.S. Appl. No. 13/125,524, filed Apr. 21, 2011, Bernbo et al.
U.S. Appl. No. 13/174,350, filed Jun. 30, 2011, Bernbo et al.
Anonymous: "Squid configuration directive reply_body_max_size", Dec. 21, 2008, pp. 1-2. XP55042055, Retrieved from the Internet: URL:http://web.archive.org/web/20081221142145/http://www.squid-cache.org/Doc/config/reply_body_max_size/ [retrieved on Oct. 24, 2012], p. 1.
Anonymous: "FAQ: How do I block large files by Content Size before download?", Mar. 23, 2009, pp. 1-2, XP55042048, Retrieved from the Internet: URL:http://www.trustwave.com/support/kb/article.aspx?id=13166, [retrieved on Oct. 24, 2012], p. 1.
Anonymous: "Queues for Prioritized Message Processing", Feb. 6, 2009, p. 1, XP55042195, Retrieved from the Internet: URL:http://web.archive.org/web/20090206110207/http://help.sap.com/saphelp_nw04/helpdata/en/04/827440c36ed562e10000000a155106/content.htm, [retrieved on Oct. 25, 2012], p. 1.

(56) References Cited

OTHER PUBLICATIONS

Chi Zhang et al: "Brushwood: Distributed Trees in Peer-to-Peer Systems", 2005, Peer-To-Peer Systems IV Lecture Notes in Computer Science;;LNCS, Springer, Berlin, DE, pp. 47-57, XP019019955, ISBN: 978-3-540-29068-1, sections 1-3.

Anonymous: "FastTrack", Jan. 8, 2011, pp. 1-3, XP55041807, Retrieved from the Internet: URL:http://de.wikipedia.org/w/index.php?title=FastTrack&oldid=83614953 [retrieved on Oct. 22, 2012], pp. 1-2.

Anonymous: "Load balancing (computing)", Aug. 25, 2011, pp. 1-6, XP55041742, Retrieved from the Internet: URL:http://en.wikipedia.org/w/index.php?title=Load_balancing_%28computing%29&oldid=44665 5159 [retrieved on Oct. 22, 2012], pp. 1-5.

U.S. Appl. No. 13/170,672, filed Jun. 28, 2011, Bernbo et al.
U.S. Appl. No. 13/170,735, filed Jun. 28, 2011, Bernbo et al.
International Patent Application No. PCT/EP2009/63796: Written Opinion, Jan. 18, 2010, 6 pages.
International Patent Application No. PCT/EP2009/63796: International Preliminary Report on Patentability, Jan. 12, 2011, 5 pages.
International Patent Application No. PCT/EP2011/056317: International Search Report, Aug. 9, 2011, 4 pages.
Tang et al., "An Efficient Data Location Protocol for Self-organizing Storage Clusters", Supercomputing, ACM/IEEE Conference, Phoenix, AZ, USA, Nov. 15-21, 2003, 1-13.
Weatherspoon et al., "Antiquity: Exploiting a Secure Log for Wide-Area Distributed Storage", Proceedings of the 2007 EuroSys Conference, ACM 2007, Lisbon, Portugal, Mar. 21-23, 2007, 371-384.

\* cited by examiner

METHOD AND DEVICE FOR MAINTAINING DATA IN A DATA STORAGE SYSTEM COMPRISING A PLURALITY OF DATA STORAGE NODES

CROSS-REFERENCE TO RELATED APPLICATIONS

This application includes subject matter that may be related to subject matter included in the following applications: U.S. patent application Ser. No. 13/224,404 entitled "Method And Device For Writing Data To A Data Storage System Comprising A Plurality Of Data Storage Nodes," filed Sep. 2, 2011; U.S. patent application Ser. No. 13/224,415 entitled "Method For Data Maintenance," filed Sep. 2, 2011; U.S. patent application Ser. No. 13/224,424 entitled "Method For Handling Requests In A Storage System And A Storage Node For A Storage System," filed Sep. 2, 2011; U.S. patent application Ser. No. 13/224,433 entitled "Method For Data Retrieval From A Distributed Data Storage System," filed Sep. 2, 2011; and U.S. patent application Ser. No. 13/224,446 entitled "Method For Updating Data In A Distributed Data Storage System," filed Sep. 2, 2011.

TECHNICAL FIELD

The present disclosure relates to a method and device for maintaining data in a data storage system comprising a plurality of data storage nodes, the method being employed in a storage node in the data storage system.

BACKGROUND

Such a method is disclosed e.g. in U.S. Patent Publication 2005/0246393 A1. This method is disclosed for a system that uses a plurality of storage centres at geographically disparate locations. Distributed object storage managers are included to maintain information regarding stored data.

One problem associated with such a system is how to accomplish simple and yet robust and reliable maintenance of data.

SUMMARY OF THE INVENTION

Therefore, the present disclosure relates to a method for maintaining data in a data storage system, comprising a plurality of data storage nodes, the method being employed in a storage node in the data storage system and comprising: monitoring and detecting, conditions in the data storage system that imply the need for replication of data between the nodes in the data storage system; initiating replication processes in case such a condition is detected, wherein the replication processes include sending multicast and unicast requests to other storage nodes, said requests including priority flags, receiving multicast and unicast requests from other storage nodes, wherein the received requests include priority flags, ordering the received requests in different queues depending on their priority flags, and dealing with requests in higher priority queues with higher frequency than requests in lower priority queues. This ensures that requests in the maintenance process with relatively high priority are dealt with first.

Queues with higher priorities may have a longer length than queues with lower priorities, and when a queue becomes full and a further request relating to that queue is received from an originating node, a busy message may be sent back to that originating node. The received request may then be discarded.

The queue with the highest priorities may be reserved for requests from non-storage node devices.

Further a device for maintaining data in a data storage system is considered, comprising a plurality of data storage nodes, the device being included in a storage node in the data storage system and comprising: a monitoring and detecting unit, monitoring and detecting conditions in the data storage system that imply the need for replication of data between the nodes in the data storage system; a replication unit initiating replication processes in case such a condition is detected, wherein the replication processes include sending multicast and unicast requests to other storage nodes, said requests including priority flags, a receiver, receiving multicast and unicast requests from other storage nodes, wherein the received requests include priority flags, a queue unit, ordering the received requests in different queues depending on their priority flags, and a processor dealing with requests in higher priority queues with higher frequency than requests in lower priority queues.

DETAILED DESCRIPTION

Figure 1:
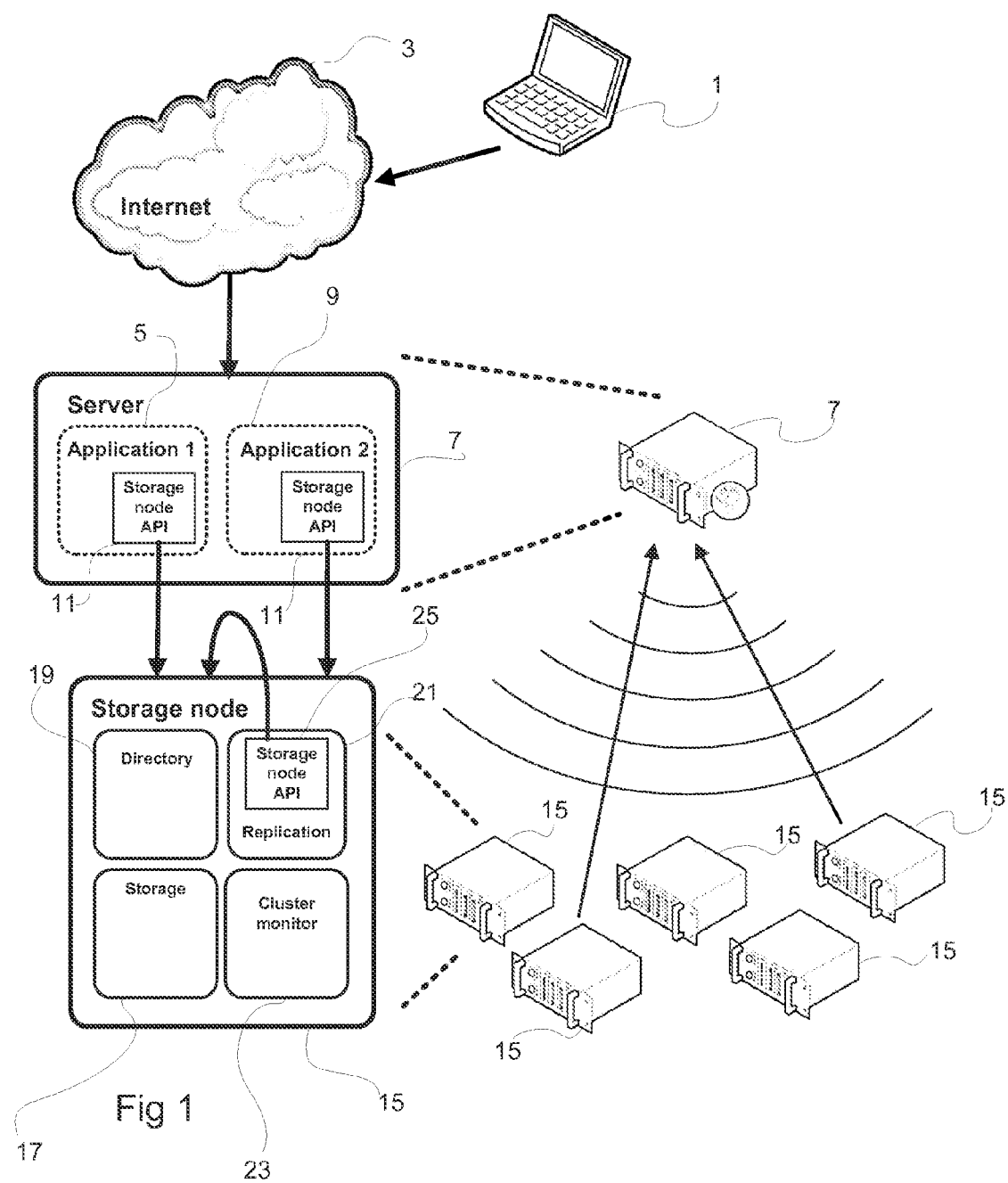
FIG. 1 illustrates a distributed data storage system.

The present disclosure is related to a distributed data storage system comprising a plurality of storage nodes. The structure of the system and the context in which it is used is outlined in FIG. 1.

A user computer 1 may access, via the Internet 3, an application 5 running on a server 7. The user context, as illustrated here, may therefore be a regular client-server configuration, which is well known per se. However, it should be noted that the data storage system to be disclosed may be useful also in other configurations.

In the illustrated case, two applications 5, 9 run on the server 7. Of course however, this number of applications may be different. Each application has an API (Application Programming Interface) 11 which provides an interface in relation to the distributed data storage system 13 and supports requests, typically write and read requests, from the applications running on the server. From an application's point of view, reading or writing information from/to the data storage system 13 need not appear different from using any other type of storage solution, for instance a file server or simply a hard drive.

Each API 11 may communicate with storage nodes 15 in the data storage system 13, and the storage nodes may communicate with each other. These communications may be based on TCP (Transmission Control Protocol) and UDP (User Datagram Protocol). These concepts are well known to the skilled person, and are not explained further.

It should be noted that different APIs 11 on the same server 7 may access different sets of storage nodes 15. It should further be noted that there may exist more than one server 7 which accesses each storage node 15. This, however does not to any greater extent affect the way in which the storage nodes operate, as will be described later.

The components of the distributed data storage system are the storage nodes 15 and the APIs 11, in the server 7 which access the storage nodes 15. The present disclosure therefore relates to methods carried out in the server 7 and in the storage nodes 15. Those methods will primarily be embodied as combinations of software and hardware implementations which are implemented on the server and the storage nodes, respectively, and are together determining for the operation and the properties of the overall distributed data storage system.

The storage node 15 may typically be embodied by a file server which is provided with a number of functional blocks. The storage node may thus comprise a storage medium 17, which typically comprises of a number of hard drives, optionally configured as a RAID (Redundant Array of Independent Disk) system. Other types of storage media are however conceivable as well.

The storage node 15 may further include a directory 19, which comprises lists of data entity/storage node relations as a host list, as will be discussed later.

In addition to the host list, each storage node may further contain a node list including the IP addresses of all storage nodes in its set or group of storage nodes. The number of storage nodes in a group may vary from a few to hundreds or thousands of storage nodes. The node list may further have a version number.

Additionally, the storage node 15 may include a replication block 21 and a cluster monitor block 23. The replication block 21 may include a storage node API 25, and may be configured to execute functions for identifying the need for and carrying out a replication process, as will be described in detail later. The storage node API 25 of the replication block 21 may contain code that to a great extent corresponds to the code of the server's 7 storage node API 11, as the replication process comprises actions that correspond to a great extent to the actions carried out by the server 7 during reading and writing operations to be described. For instance, the writing operation carried out during replication may correspond to a great extent to the writing operation carried out by the server 7. The cluster monitor block 23 may be configured to carry out monitoring of other storage nodes in the data storage system 13, as will be described in more detail later.

The storage nodes 15 of the distributed data storage system can be considered to exist in the same hierarchical level. There is no need to appoint any master storage node that is responsible for maintaining a directory of stored data entities and monitoring data consistency, etc. Instead, all storage nodes 15 can be considered equal, and may, at times, carry out data management operations vis-à-vis other storage nodes in the system. This equality ensures that the system is robust. In case of a storage node malfunction other nodes in the system will cover up the malfunctioning node and ensure reliable data storage.

The operation of the system will be described in the following order: reading of data, writing of data, and data maintenance. Even though these methods work very well together, it should be noted that they may in principle also be carried out independently of each other. That is, for instance the data reading method may provide excellent properties even if the data writing method of the present disclosure is not used, and vice versa.

The reading method may be described with reference to FIGS. 2A-2C and 3, FIG. 3 is a flowchart illustrating an example method.

The reading, as well as other functions in the system, may utilise multicast communication to communicate simultaneously with a plurality of storage nodes. By a multicast or IP multicast is here meant a point-to-multipoint communication which may be accomplished by sending a message to an IP address which is reserved for multicast applications.

For example, a message, typically a request, is sent to such an IP address (e.g. 244.0.0.1), and a number of recipient servers are registered as subscribers to that IP address. Each of the recipient servers has its own IP address. When a switch in the network receives the message directed to 244.0.0.1, the switch forwards the message to the IP addresses of each server registered as a subscriber.

In principle, a single server may be registered as a subscriber to a multicast address, in which case a point-to-point communication is achieved. However, in the context of this disclosure, such a communication may nevertheless be considered a multicast communication since a multicast scheme is employed.

Unicast communication is also employed referring to a communication with a single recipient.

Figure 2A:
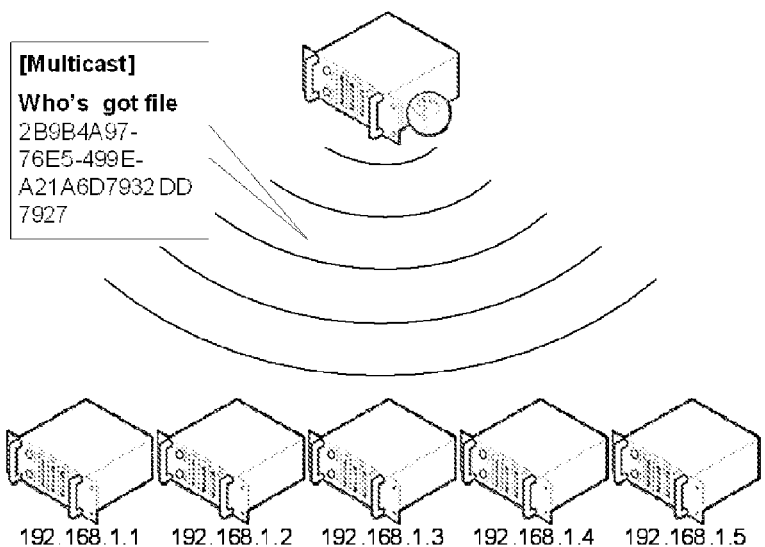
FIGS. 2A-2C, and FIG. 3 illustrate a data reading process.
Figure 2B:
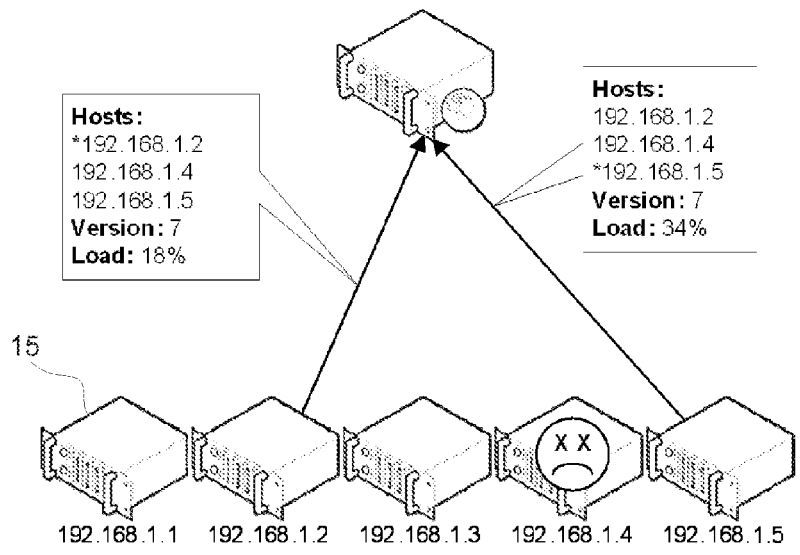
Figure 3:
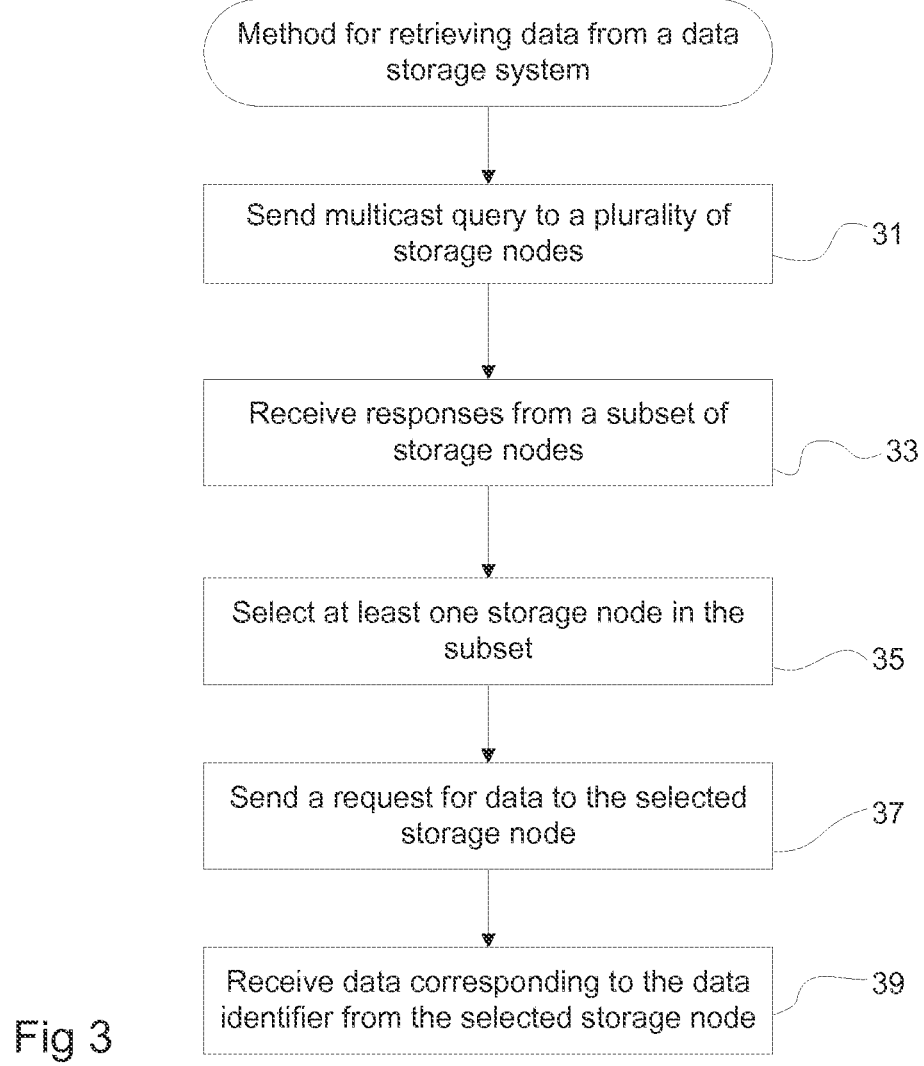

With reference to FIG. 2A and FIG. 3, the method for retrieving data from a data storage system may comprise the sending 31 of a multicast query to a plurality of storage nodes 15. In the illustrated case there are five storage nodes each having an IP (Internet Protocol) address 192.168.1.1, 192.168.1.2, etc. The number of storage nodes is, needless to say, just an example. The query contains a data identifier "2B9B4A97-76E5-499E-A21A6D7932DD7927", which may for instance be a Universally Unique Identifier (UUID) or other identification.

The storage nodes scan themselves for data corresponding to the identifier. If such data is found, a storage node sends a response, which is received 33 by the server 7, cf. FIG. 2B. As illustrated, the response may optionally contain further information in addition to an indication that the storage node has a copy of the relevant data. Specifically, the response may contain information from the storage node directory about other storage nodes containing the data, information regarding which version of the data is contained in the storage node, and information regarding which load the storage node at present is exposed to.

Figure 2C:
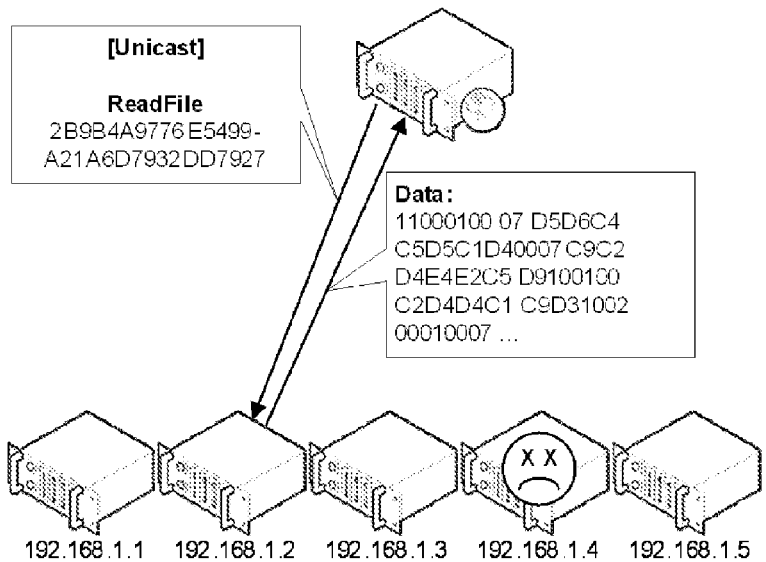

Based on the responses, the server selects 35 one or more storage nodes from which data is to be retrieved, and may send 37 a unicast request for data to that/those storage nodes, cf. FIG. 2C.

In response to the request for data, the storage node/nodes may send the relevant data by unicast to the server which receives 39 the data. In the illustrated case, a single storage node is selected. While this is sufficient, it is possible to select more than one storage node in order to receive two sets of data which makes a consistency check possible. If the transfer of data fails, the server may select another storage node for retrieval.

The selection of storage nodes may be based on an algorithm that take several factors into account in order to achieve a good overall system performance. Typically, the storage node having the latest data version and the lowest load will be selected although other concepts are fully conceivable.

Optionally, the operation may be concluded by server sending a list to all storage nodes involved, indicating which nodes contains the data and with which version. Based on this information, the storage nodes may themselves maintain the data properly by the replication process to be described.

FIGS. 4A-4C and FIG. 5 illustrate an example data writing process for the distributed data storage system.

Figure 4A:
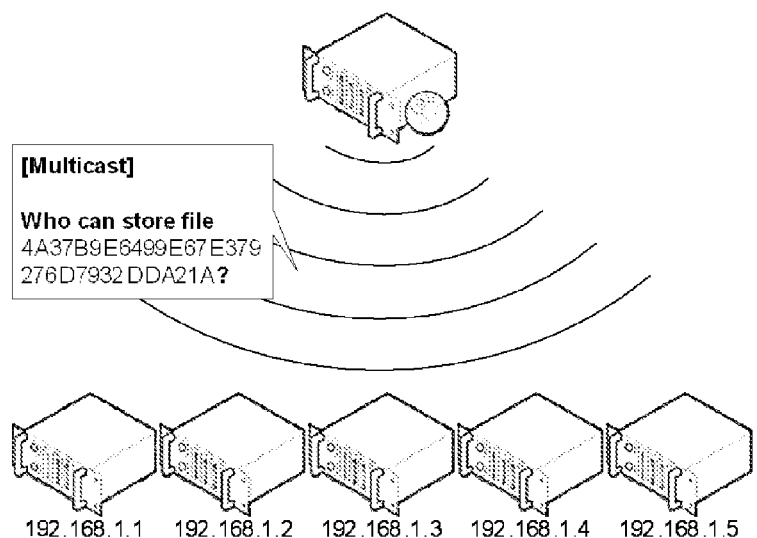
FIGS. 4A-4C, and FIG. 5 illustrate a data writing process.
Figure 5:
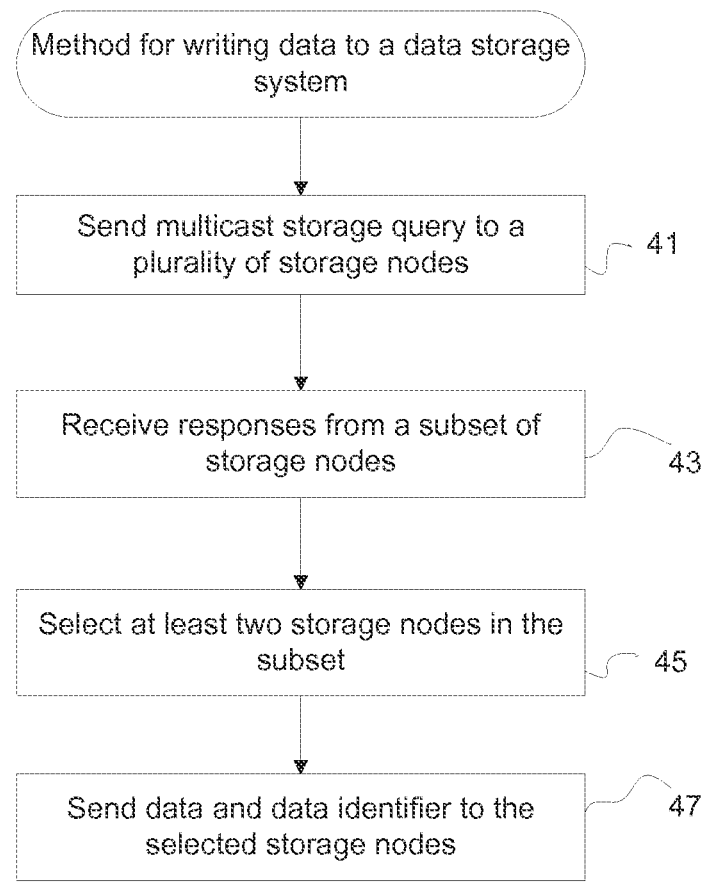

With reference to FIG. 4A and FIG. 5 the method may comprise a server sending 41 a multicast storage query to a plurality of storage nodes. The storage query may comprise a data identifier and includes a request to the receiving storage nodes can asking the storage nodes if they can store the file. Optionally, the storage nodes may check with their internal directories whether they already have a file with this name, and may notify the server 7 in the unlikely event that this is the case, such that the server may rename the file.

Figure 4B:
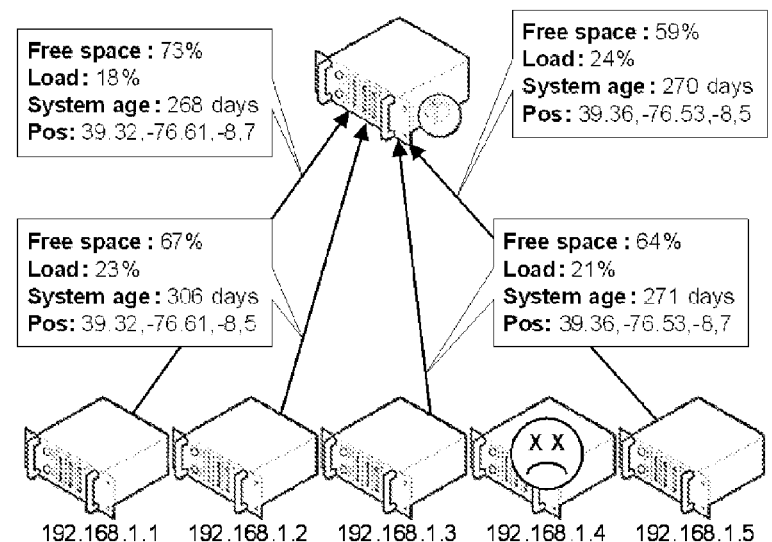
Figure 4C:
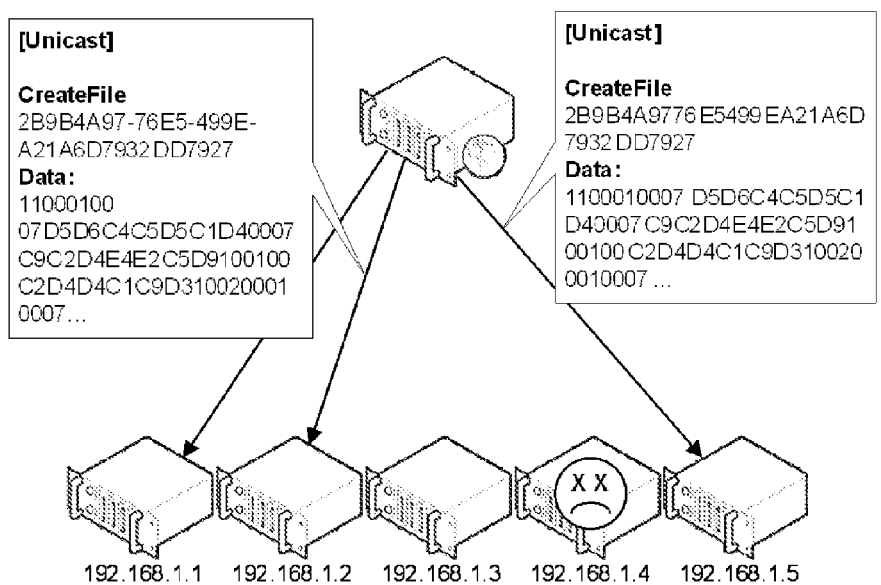

In any case, at least one or a subset of the storage nodes may provide responses by unicast transmission to the server 7. For example, storage nodes having a predetermined minimum free disk space may answer to the query. The server 7 may receive 43 the responses which may include geographic data relating to the geographic position of each server. For instance, as indicated in FIG. 4B, the geographic data may include the latitude, the longitude and the altitude of each server. Other types of geographic data may however also be conceivable, such as a ZIP code or the like.

In addition to the geographic data, further information may be provided that serves as an input to a storage node selection process. In the illustrated example, the amount of free space in each storage node is provided together with an indication of the storage node's system age and an indication of the load that the storage node currently experiences.

Based on the received responses, the server selects 45 at least two, in a typical embodiment three, storage nodes in the subset for storing the data. The selection of storage nodes is carried out by means of an algorithm that takes different data into account. The selection may be carried out in order to achieve some kind of geographical diversity. In an example, the selection is performed such that selection of file servers in the same rack are not chosen as the selected storage nodes. Typically, a great geographical diversity may be achieved, even selecting storage nodes on different continents. In addition to the geographical diversity, other parameters may be included in the selection algorithm. In an example, geographical diversity may be the primary selection criteria. In this example, as long as a minimum geographic diversity is achieved, free space, system age and current load may also be taken into account.

When the storage nodes have been selected, the data to be stored and a corresponding data identifier may be sent to each selected node, typically using a unicast transmission.

Optionally, the operation may be concluded by each storage node, which has successfully carried out the writing operation, sending an acknowledgement to the server. The server may then send a list to all storage nodes involved indicating which nodes have successfully written the data and which have not. Based on this information, the storage nodes may themselves maintain the data properly by the replication process to be described. For instance if one storage node's writing failed, there exists a need to replicate the file to one more storage node in order to achieve the desired number of storing storage nodes for that file.

The data writing method in itself allows an API in a server 7 to store data in a very robust way, as excellent geographic diversity may be provided.

In addition to the writing and reading operations, the API in the server 7 may carry out operations that delete files and update files. These processes will be described in connection with the data maintenance process below.

The aim of the data maintenance process is to make sure that a reasonable number of non-malfunctioning storage nodes each store the latest version of each file. Additionally, it may provide the function that no deleted files are stored at any storage node. The maintenance is carried out by the storage nodes themselves. There is thus no need for a dedicated "master" that takes responsibility for the maintenance of the data storage. This ensures improved reliability as the "master" would otherwise be a weak spot in the system.

Figure 6:
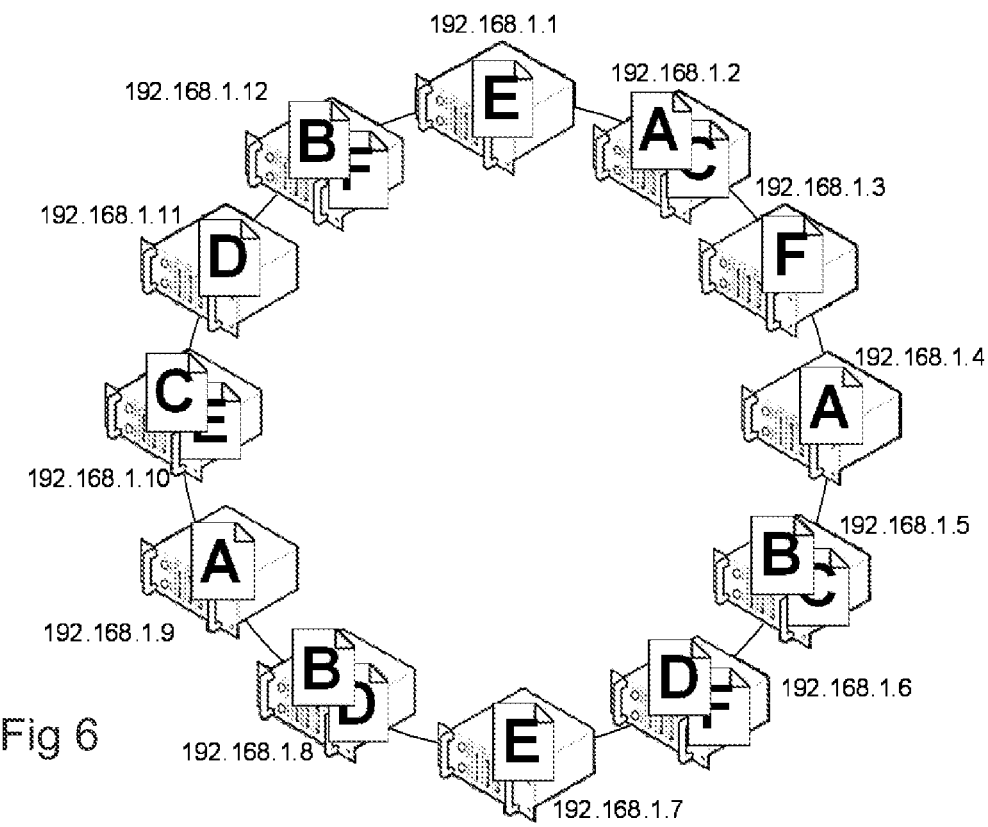
FIG. 6 illustrates schematically a situation where a number of files are stored among a number of data storage nodes.

FIG. 6 illustrates schematically a situation where a number of files are stored among a number of data storage nodes. In the illustrated case, twelve nodes, having IP addresses consecutively numbered from 192.168.1.1 to 192.168.1.12, are depicted for illustration purposes. Needless to say however, the IP address numbers need not be in the same range at all. The nodes are placed in a circular order only to simplify the description, i.e. the nodes need not have any particular order. Each node store one or two files identified, for the purpose of simplicity, by the letters A-F.

Figure 8:
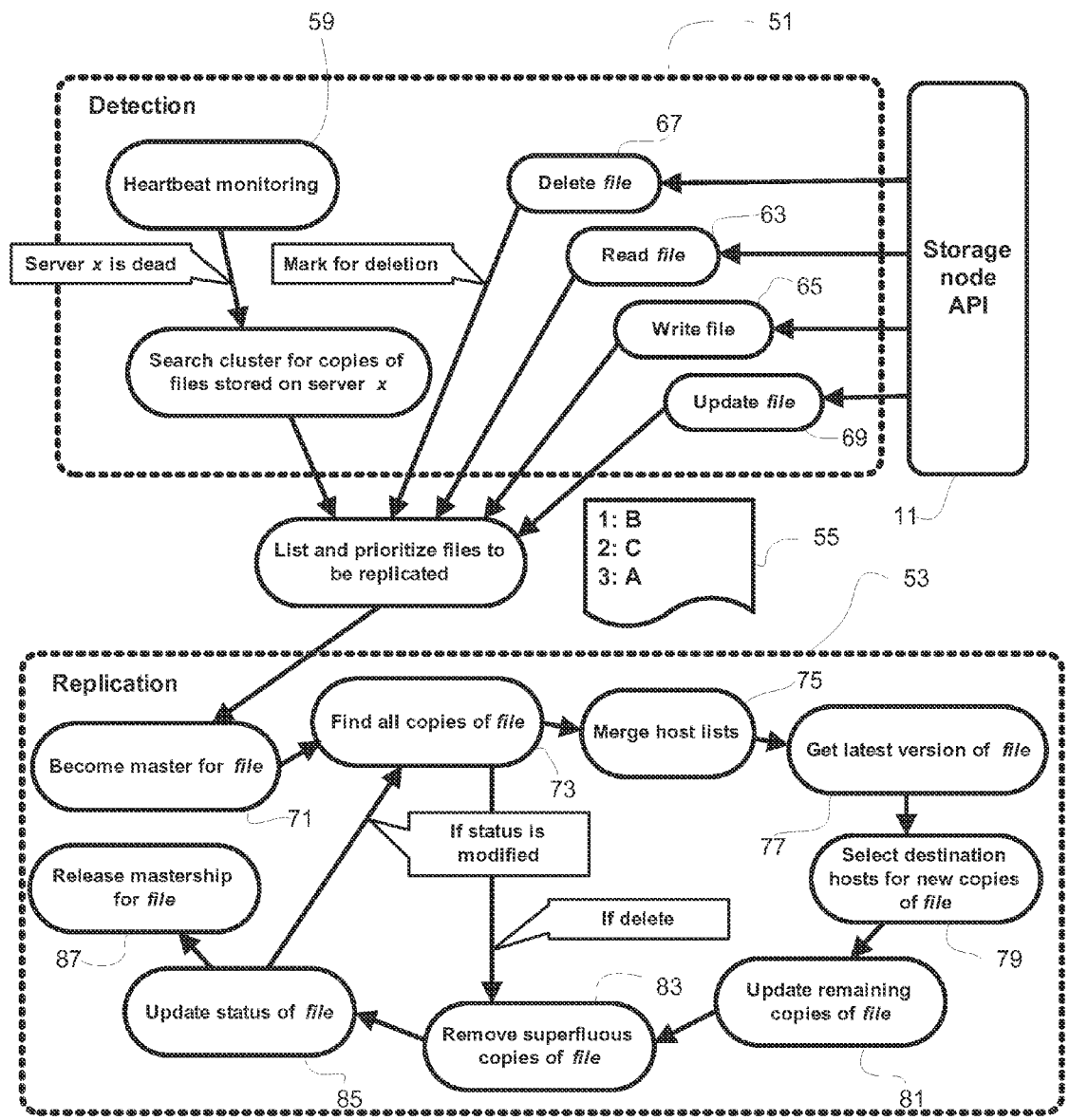
FIG. 8 is an overview of a data maintenance process.

With reference to FIG. 8, the method for maintaining data comprises the detecting 51 conditions in the data storage system that imply the need for replication of data between the nodes in the data storage system, and a replication process 53. The result of the detection process 51 is a list 55 of files for which the need for replication has been identified. The list may further include data regarding the priority of the different needs for replication. Based on this list the replication process 53 is carried out.

The robustness of the distributed storage relies on that a reasonable number of copies of each file, correct versions, are stored in the system. In the illustrated case, three copies of each file is stored. However, should for instance the storage node with the address 192.168.1.5 fail, the desired number of stored copies for files "B" and "C" will be fallen short of.

One event that results in a condition for triggering replication may be the malfunctioning of a storage node in the system.

Figure 7:
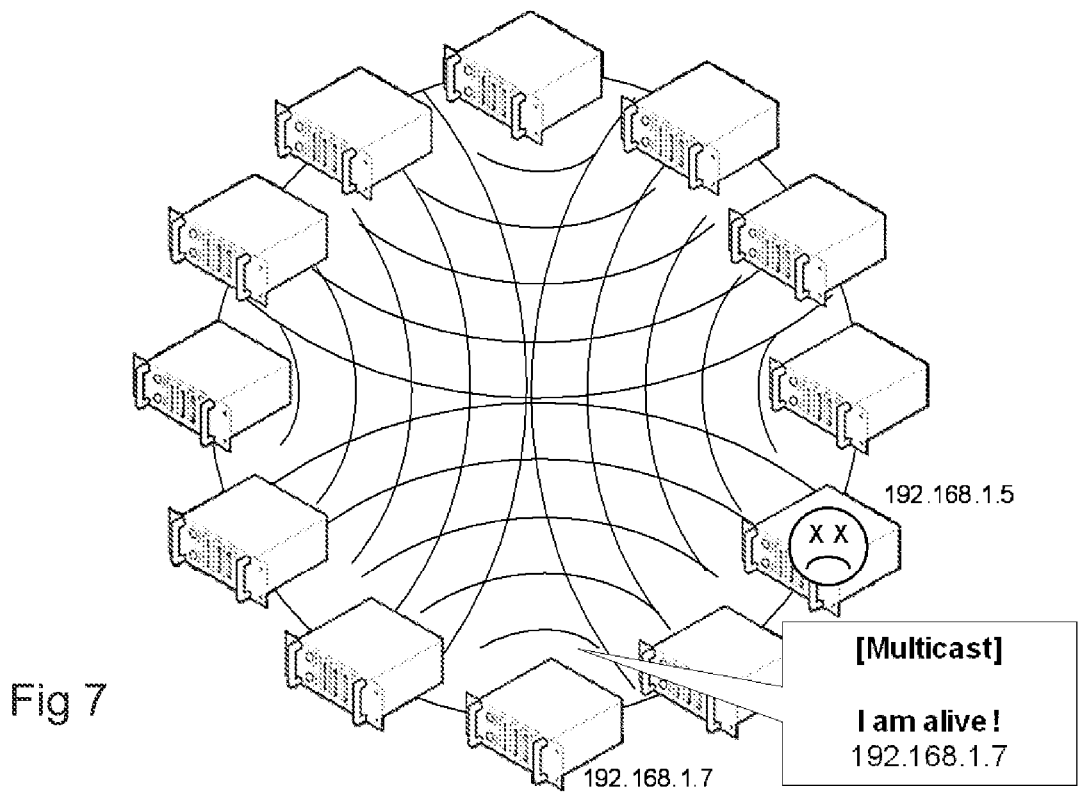
FIG. 7 illustrates the transmission of heartbeat signals.

Each storage node in the system may monitor the status of other storage nodes in the system. This may be carried out by letting each storage node emit a so-called heartbeat signal at regular intervals, as illustrated in FIG. 7. In the illustrated case, the storage node with address 192.168.1.7 emits a multicast signal 57 to the other storage nodes in the system, indicating that it is working correctly. This signal may be received by all other functioning storage nodes or a subset of the functioning storage nodes in the system, for example nodes carrying out heartbeat monitoring 59 (cf. FIG. 8). In the case with the storage node with address 192.168.1.5 however, this node is malfunctioning and does not emit any heartbeat signal. Therefore, the other storage nodes may notice that no heartbeat signal has been emitted by this node in a long time which may indicate that the storage node in question is down.

The heartbeat signal may, in addition to the storage node's address, include its node list version number. Another storage node, listening to the heartbeat signal and finding out that the transmitting storage node has a later version node list, may then request that transmitting storage node to transfer its node list. This means that addition and removal of storage nodes can be obtained simply by adding or removing a storage node and sending a new node list version to one single storage node. This node list will then spread to all other storage nodes in the system.

Again with reference to FIG. 8, each storage node may search 61 its internal directory for files that are stored by the malfunctioning storage node. Storage nodes which themselves store files "B" and "C" will find the malfunctioning storage node and can therefore add the corresponding file on their lists 55.

The detection process may however also reveal other conditions that imply the need for replicating a file. Typically such conditions may be inconsistencies, e.g. one or more storage nodes has an obsolete version of the file. A delete operation may also imply a replication process as this process may carry out the actual physical deletion of the file. The server's delete operation may ensure that the storage nodes set a deletion flag for the file in question. Each node may therefore monitor reading and writing operations carried out in the data storage system. Information provided by the server 7 at the conclusion of reading and writing operations, respectively, may indicate that one storage node contains an obsolete version of a file (in the case of a reading operation) or that a storage node did not successfully carry out a writing operation. In both cases there exists a need for maintaining data by replication such that the overall objects of the maintenance process are fulfilled.

In addition to the basic reading and writing operations 63, 65, at least two additional processes may provide indications that a need for replication exists, namely the deleting 67 and updating 69 processes that are now given a brief explanation.

The deleting process may be initiated by the server 7 (cf. FIG. 1). Similar to the reading process, the server may send a query by multicasting to all storage nodes, in order to find out which storage nodes has data with a specific data identifier. The storage nodes scan themselves for data with the relevant identifier, and may respond by a unicast transmission if they have the data in question. The response may include a list, from the storage node directory, of other storage nodes containing the data. The server 7 then sends a unicast request, to the storage nodes that are considered to store the file, that the file is to be deleted. Each storage node may set a flag relating to the file and indicating that it should be deleted. The file may then be added to the replication list, and an acknowledgement is sent to the server. The replication process may then physically deletes the file as will be described.

The updating process has a search function, similar to the one of the deleting process, and a writing function, similar to the one carried out in the writing process. The server may send a query by multicasting to all storage nodes, in order to find out which storage nodes has data with a specific data identifier. The storage nodes scan themselves for data with the relevant identifier, and may respond by a unicast transmission if they have the data in question. The response may include a list, from the storage node directory, of other storage nodes containing the data. The server 7 may then send a unicast request, telling the storage nodes to update the data. The request may contain the updated data. The storage nodes updating the data may send an acknowledgement to the server, which responds by sending a unicast transmission containing a list with the storage nodes that successfully updated the data, and the storage nodes which did not. Again, this list can be used by the maintenance process.

Again with reference to FIG. 8 the read 63, write 65, delete 67, and update 69 operations may all indicate that a need for replication exists. The same applies for the heartbeat monitoring 59. The overall detection process 51 thus generates data regarding which files need be replicated. For instance, a reading or updating operation may reveal that a specific storage node contains an obsolete version of a file. A deletion process may set a deletion flag for a specific file. The heartbeat monitoring may reveal that a number of files, stored on a malfunctioning storage node may need be replicated to a new storage node.

Each storage node may monitors the need for replication for all the files it stores, for example by maintaining a replication list 55. The replication list 55 thus may contain a number of files to be replicated. The files may be ordered in correspondence with the priority for each replication. Typically, there may be three different priority levels. The highest level may be reserved for files which the storage node holds the last online copy of Such a file may be higher priority and may be quickly replicated to other storage nodes such that a reasonable level of redundancy may be achieved. A medium level of priority may relate to files where the versions are inconsistent among the storage nodes. A lower level of priority may relate to files which are stored on a storage node that is malfunctioning. An even lower level may be introduced that deals with files for which too many copies are stored, the replication list thus having four levels.

The storage node deals with the files on the replication list 55 in accordance with their level of priority. The replication process is now described for a storage node which is here called the operating storage node, although all storage nodes may operate in this way.

The replication part 53 of the maintaining process may start with the operating storage node attempting 71 to become the master for the file it intends to replicate. The operating storage nodes may send a unicast request to become master to other storage nodes that are known store the file in question. The directory 19 (cf. FIG. 1) may provide a host list comprising information regarding which storage nodes to ask. In the event, for instance in case of a colliding request, that one of the storage nodes does not respond affirmatively, the file may be moved back to the list for the time being, and an attempt is instead made with the next file on the list. Otherwise the operating storage node may be considered to be the master of this file and the other storage nodes may set a flag indicating that the operating storage node is master for the file in question.

At 73, all copies of the file in question in the distributed storage system may be located. This may be carried out by the operating storage node sending a multicast query to all storage nodes, asking which ones of them have the file. The storage nodes having the file may submit responses to the query, which may contain the version of the file they keep as well as their host lists, e.g. the list of storage nodes containing the relevant file that is kept in the directory of each storage node. These host lists may then be merged 75 by the operating storage node, such that a master host list is formed corresponding to the union of all retrieved host lists. If additional storage nodes are found, which were not asked when the operating storage node attempted to become master, that step may now be repeated for the additional storage nodes. The master host list may contain information regarding which versions of the file the different storage nodes keep and may illustrate the status of the file within the entire storage system.

Should the operating storage node not have the latest version of the file in question, this file may then be retrieved 77 from one of the storage nodes that do have the latest version.

The operating storage node may decide 79 whether the host list should be changed, typically if additional storage nodes should be added. If so, the operating storage node may carry out a process very similar to the writing process as carried out by the server and as described in connection with FIGS. 4A-4C and FIG. 5. The result of this process is that the file is written to a new storage node.

In case of version inconsistencies, the operating storage node may update 81 copies of the file that are stored on other storage nodes, such that all files stored have the correct version.

Superfluous copies of the stored file may be deleted 83. If the replication process is initiated by a delete operation, the process may jump directly to this step. Then, once all storage nodes that store the file have accepted the deletion of the file, the operating storage node may request, for example using unicast, all storage nodes to physically delete the file in question. The storage nodes may acknowledge that the file is deleted.

Further the status, e.g., the master host list of the file may be updated. It is then optionally possible to repeat steps 73-83, for example to ensure that the need for replication no longer exists. This repetition should result in a consistent master host list that need not be updated in step 85.

Thereafter, the replication process for that file is concluded, and the operating storage node may release 87 the status as master of the file by sending a corresponding message to all other storage nodes on the host list.

As previously mentioned, a storage node may have a replication list with different levels of priority, where the priority levels decide the order in which files are replicated among the storage nodes. It is also useful to define a mechanism that deals with priorities of the tasks of non-master nodes in the replication process. More specifically, a storage node, which is appointed as master for the replication of a file, may generate work that is to be carried out on other storage nodes in the cluster, for example requests that need be answered to.

The storage nodes act fairly independently in the replication process, as there will usually be no hierarchically higher entity that co-ordinates activities and makes sure that the most important ones are carried out first. For example, a specific storage node with low priority level tasks on its replication list may carry out those tasks without knowing that those tasks may, in the cluster, slow down other tasks that have higher priorities, since those more important tasks may for instance relate to files that the specific storage node does not store.

In some cases, a storage node may be jammed by a number of requests from a number of other storage nodes each trying to replicate a file. This may be the case, for instance, with a storage node that comes online after being offline for a considerable time. In such a case, a number of other storage nodes may notice, from the reappearing storage node's heartbeat, that some of their files are stored by too many storage nodes, since the previously absent node's files may have already been replicated. There may also be version inconsistencies. Usually, a lot of traffic will in such cases be directed towards the reappearing storage node. This traffic may involve requests to read and write data on the reappearing storage node's disks and may take a considerable time. In some cases, this may even slow down reading and writing processes carried out by external clients, i.e. from the server (7, FIG. 1).

Figure 9:
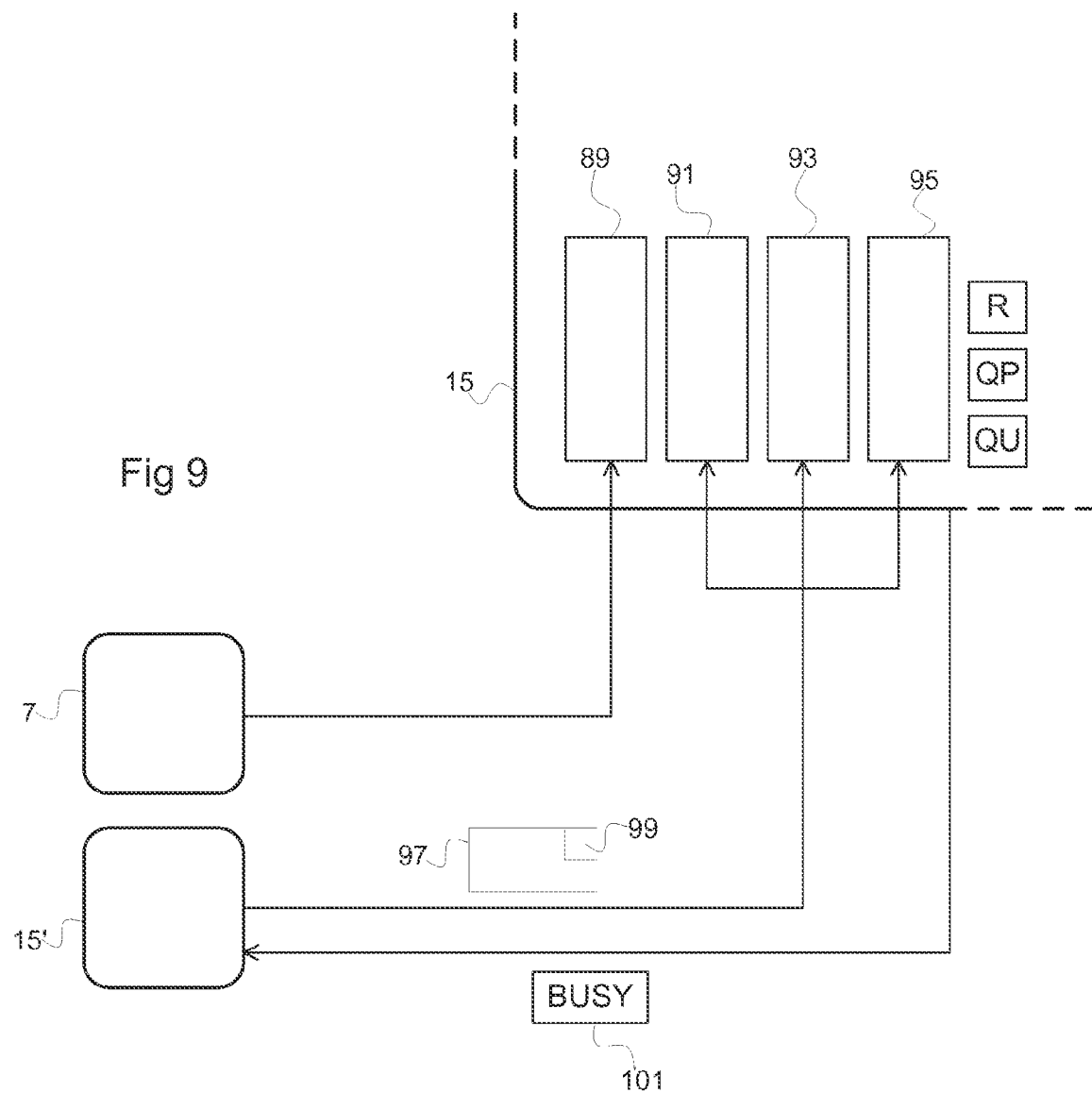
FIG. 9 illustrates a mechanism for avoiding congestions in the data maintenance process.

FIG. 9 illustrates schematically a mechanism for dealing with such situations. The mechanism may involve in a storage node 15 a set of work-queue lists 89, 91, 93, and 95 with different priority levels. The work-queue lists may handle incoming requests, received by a receiving unit R, at the node 15. A queue unit (QU) may sort incoming requests in the queues depending on their priorities, and a processor (QP) may process and answer the requests in the queues.

In an example, the work-queue list with the highest priority may deal with requests from an external client, e.g., an application running on a server 7 and utilizing the cluster. This allows requests from applications (for example read and write operations as discussed initially) to be dealt with first at all times.

Further, there may exist a number of work-queue lists 91, 93, 95 intended for replication requests initiated by another storage node 15' as a replication master. The priorities of those work-queue lists may be mapped with a one to one relationship to the priorities of the replication list (cf. 55, FIG. 8) of that another storage node 15', such that the requests resulting from replications with the highest priorities may end up in the work-list queue 91 with the second highest priority, etc., even though other possibilities exist, such as using fewer or more levels of priorities at the work-queue lists, etc.

In order allow the receiving storage node 15 to sort incoming requests 97 properly, such requests may be provided with a tag 99 including the priority in question.

The work-queue lists 89-95 may have predefined sizes, particularly the ones with the lowest priorities. For example, the higher the priority, the greater the corresponding work-queue size. The sizes may be predefined or may be altered dynamically depending on system performance over a time window, such that a maximum response time may be provided.

The storage node 15 may sort incoming requests into the work-queue lists 89-95 in accordance with the respective tagged priorities, and may deal with the requests in the lists relatively in their order of priority.

For instance, twice as many requests may be dealt with in the list 89 with the highest priority, as compared with in the list 91 with the second highest priority. The same relationship may exist between the second and third list, etc. Thus for four lists the relationship between the frequency which the node deals with request in queues may be 8:4:2:1, although this is only one conceivable example.

While the storage node 15 works on the requests in the lists 89-95, new requests may continue to pour into the lists, and at some point it may be the case that a list, typically the one 95 with the lowest priority, becomes full, and is unable to receive further requests. If further requests with that level of priority are received, or optionally a request with an even lower level of priority, the storage node 15 may respond by sending a BUSY message 101 to the storage node 15' from which the request in question originated.

This BUSY message may inform the originating storage node 15' that the storage node to which it sent a request is busy with more important replication processes at this instant. In response, the originating storage node 15' may halt the replication process during a predetermined time period, to avoid disturbing hot spots in the storage cluster. When this period has lapsed the originating storage node 15' may make a new attempt to send its request. Optionally, the originating storage node 15' may, during this period, work with other replications on its replication list, for which the busy storage node 15 may be uninvolved.

It is thereby accomplished a mechanism that ensures that the storage system is focusing on the most important tasks, without any centralized control. Additionally, it is ensured that a request is accepted at a receiving storage node 15 if it is likely that this request can be dealt with in a reasonable time frame.

This system where each storage node takes responsibility for maintaining all the files it stores throughout the set of storage nodes provides a self-repairing (in case of a storage node malfunction) self-cleaning (in case of file inconsistencies or files to be deleted) system with excellent reliability. It is easily scalable and can store files for a great number of different applications simultaneously.

The invention is not restricted to the specific disclosed examples and may be varied and altered in different ways within the scope of the appended claims.

What is claimed:

1. A method for maintaining data in a data storage system, the data storage system including a plurality of data storage nodes, the method comprising:
   monitoring the plurality of data storage nodes;
   detecting a condition in the data storage system, the condition indicating that data stored on at least one of the plurality of data storage nodes should be replicated within the data storage system;

initiating a replication process based on detecting the condition, wherein the replication process comprises sending at least one of a multicast or unicast request to at least one data storage node of the plurality of data storage nodes, said request including a respective priority flag indicative of a relative priority for the replication of the data;

receiving a first request from at least one data storage node of the plurality of data storage nodes, wherein the first request is at least one of a multicast or unicast request and includes a first priority flag;

receiving a second request from at least one data storage node of the plurality of data storage nodes, wherein the second request is at least one of a multicast or unicast request and includes a second priority flag;

ordering the requests in a plurality of priority queues based on the first and second priority flags, wherein requests that include the first priority flag are included in a higher priority queue and requests that include the second priority flag are included in a lower priority queue; and concurrently processing the plurality of priority queues at defined frequencies, wherein requests in the higher priority queue are processed with a first frequency, requests in the lower priority queue are processed with a second frequency, and the first frequency is greater than the second frequency.

2. The method according to claim 1, wherein a length of the higher priority queue is longer than a length of the lower priority queue.

3. The method according to claim 1, further comprising:

receiving sufficient requests to cause at least one of the higher priority queue or the lower priority queue to become full;

receiving another request to be included in the full queue from an originating data storage node of the plurality of data storage nodes; and sending a busy message the originating data storage node.

4. The method according to claim 3, wherein the received request from the originating data storage node is discarded.

5. The method according to claim 1, wherein the plurality of priority queues further comprises a highest priority queue, wherein requests in the highest priority queue are processed with higher frequency than requests in the higher priority queue, and the highest priority queue is reserved for requests from devices other than the plurality of data storage nodes.

6. The method according to claim 1, wherein one or more of the plurality of priority queues are associated with a maximum queue size and requests corresponding to the one or more queues are rejected upon reaching the maximum queue size.

7. A data storage node for maintaining data in a data storage system including a plurality of data storage nodes, the data storage node comprising:

a monitoring unit configured to monitor the plurality of data storage nodes;

a detecting unit configured to detect a condition in the data storage system, the condition indicating that data stored on at least one of the plurality of data storage nodes should be replicated within the data storage system;

a replication unit configured to initiate a replication process based on detecting the condition, wherein the replication process comprises sending at least one of a multicast or unicast request to at least one data storage node of the plurality of data storage nodes, said request including a respective priority flag indicative of a relative priority for the replication of the data;

a receiver configured to receive a first request from at least one data storage node of the plurality of data storage nodes, wherein the first request is at least one of a multicast or unicast request and includes a first priority flag;

the receiver further configured to receive a second request from at least one data storage node of the plurality of data storage nodes, wherein the second request is at least one of a multicast or unicast request and includes a second priority flag;

a queue unit configured to order the requests in a plurality of priority queues based on the first and second priority flags, wherein requests that include the first priority flag are included in a higher priority queue and requests that include the second priority flag are included in a lower priority queue; and a processor configured to concurrently process the plurality of priority queues according to defined frequencies, wherein requests in the higher priority queue are processed with higher frequency than requests in the lower priority queue.

8. The data storage node according to claim 7, wherein one or more of the plurality of priority queues are associated with a maximum queue size and requests corresponding to the one or more queues are rejected upon reaching the maximum queue size.

9. The data storage node according to claim 7, wherein the higher priority queue is longer than the lower priority queue.

10. The data storage node according to claim 8, wherein the receiver is further configured to receive sufficient requests to cause at least one of the higher priority queue or the lower priority queue to become full and receive another request to be included in the full queue from a originating data storage node of the plurality of data storage nodes, wherein the first data storage node further comprises a transmitter configured to send a busy message to the originating data storage node.

11. The data storage node according to claim 10, wherein the processor is further configured to discard the received request from the originating data storage node.

12. The data storage node according to claim 8, wherein the plurality of priority queues further comprises a highest priority queue, wherein the processor is further configure to process requests in the highest priority queue with higher frequency than requests in the higher priority queue, and the highest priority queue is reserved for requests from devices other than the plurality of data storage nodes.

13. The method according to claim 1, wherein the first frequency is a multiple of the second frequency.

14. The method according to claim 12, wherein the first frequency is an integer multiple of the second frequency.

15. The data storage node according to claim 7, wherein the processor is configured to process requests in the higher priority queue at a first frequency and requests in lower priority queue at a second frequency, and the first frequency is a multiple of the second frequency.

16. The data storage node according to claim 15, wherein the first frequency is an integer multiple of the second frequency.

* * * * *